United States Patent
Boss et al.

(10) Patent No.: US 9,252,975 B2
(45) Date of Patent: Feb. 2, 2016

(54) COMPUTER-IMPLEMENTED METHOD, TOOL, AND PROGRAM PRODUCT FOR AUTOMATICALLY REPLYING TO AN INSTANT MESSAGE

(75) Inventors: Gregory J. Boss, American Fork, UT (US); Yen-Fu Chen, Austin, TX (US); Rick A. Hamilton, II, Charlottesville, VA (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 1914 days.

(21) Appl. No.: 11/381,434

(22) Filed: May 3, 2006

(65) Prior Publication Data

US 2007/0260694 A1 Nov. 8, 2007

(51) Int. Cl.
*G06F 15/16* (2006.01)
*H04L 12/58* (2006.01)

(52) U.S. Cl.
CPC .............. *H04L 12/581* (2013.01); *H04L 51/04* (2013.01)

(58) Field of Classification Search
USPC .................................................. 709/204–207
See application file for complete search history.

(56) References Cited

U.S. PATENT DOCUMENTS

| | | | |
|---|---|---|---|
| 6,640,230 B1 * | 10/2003 | Alexander et al. ..................... 1/1 |
| 6,658,095 B1 * | 12/2003 | Yoakum et al. ............ 379/93.01 |
| 6,731,323 B2 | 5/2004 | Doss et al. |
| 6,760,580 B2 | 7/2004 | Robinson et al. |
| 6,832,245 B1 | 12/2004 | Isaacs et al. |
| 6,957,077 B2 * | 10/2005 | Dehlin .......................... 455/466 |
| 7,216,167 B2 * | 5/2007 | Hamilton et al. ............. 709/224 |
| 7,284,033 B2 * | 10/2007 | Jhanji ............................. 709/206 |
| 7,436,947 B2 * | 10/2008 | Ordille et al. ................. 379/219 |
| 7,475,109 B1 * | 1/2009 | Fletcher et al. ............... 709/204 |
| 2002/0065894 A1 * | 5/2002 | Dalal et al. .................... 709/206 |
| 2003/0046296 A1 | 3/2003 | Doss et al. |
| 2004/0199581 A1 | 10/2004 | Kucharewski et al. |
| 2005/0037741 A1 * | 2/2005 | Gilbert ....................... 455/414.1 |
| 2005/0080868 A1 * | 4/2005 | Malik ............................ 709/207 |
| 2005/0101304 A1 * | 5/2005 | Lin et al. ....................... 455/413 |
| 2005/0255868 A1 * | 11/2005 | Dehlin .......................... 455/466 |
| 2005/0276397 A1 * | 12/2005 | Hiatt et al. ................. 379/90.01 |

(Continued)

OTHER PUBLICATIONS

"ImaHima Simple Wireless Instant Messaging Platform (SWIM) Version 3.0" [retreived online on Dec. 24, 2008] Aug. 2, 2002. {Retreived from the Internet] <URL: http://web.archive.org/web/20020802195348/www.imahima.com/en/products_services.html>.*

(Continued)

*Primary Examiner* — Mohamed Wasel
*Assistant Examiner* — Tsung Wu
(74) *Attorney, Agent, or Firm* — Lisa Ulrich; Hoffman Warnick LLC (57) ABSTRACT

The present invention provides a computer-implemented method, system, tool, and program product for sending a customized reply to an instant message. Specifically, under the present invention, a customized message may be provided for a specific instant messaging contact/availability status combination. When the availability status is selected and a message is received from the instant messaging contact, the customized message is automatically sent to the messaging contact. The invention may also be integrated into a calendaring application to determine, for example, whether the message recipient is in a meeting and, if so, to automatically send a reply that gives an estimated ending time for the meeting.

19 Claims, 7 Drawing Sheets

(56) References Cited

U.S. PATENT DOCUMENTS

| | | | | |
|---|---|---|---|---|
| 2006/0161853 | A1* | 7/2006 | Chen et al. | G06Q 10/10 715/758 |
| 2006/0165092 | A1* | 7/2006 | Wilson et al. | 370/395.21 |
| 2007/0011367 | A1* | 1/2007 | Scott et al. | 710/48 |
| 2007/0192418 | A1 | 8/2007 | Adams et al. | |
| 2009/0037541 | A1* | 2/2009 | Wilson | 709/206 |
| 2010/0020728 | A1* | 1/2010 | Jefferson et al. | 370/260 |

OTHER PUBLICATIONS

Huang et al., "IM Here: Public Instant Messaging on Large, Shared Displays for Workgroup Interactions", CHI, vol. 6, No. 1, Apr. 2004, pp. 279-286.

Steven J. Vaughan-Nichols, "Presence Technology: More than Just Instant Messaging", Computer, Oct. 2003, pp. 11-13.

Steven M. Cherry, "IM Means Business", IEEE Spectrum, Nov. 2002, pp. 28-32.

* cited by examiner

COMPUTER-IMPLEMENTED METHOD, TOOL, AND PROGRAM PRODUCT FOR AUTOMATICALLY REPLYING TO AN INSTANT MESSAGE

FIELD OF THE INVENTION

The present invention generally relates to instant messaging over a network. Specifically, the present invention provides a tool that automatically sends a customized reply to a received instant message based on the identity of the sender of the message and the availability status of the recipient.

BACKGROUND OF THE INVENTION

One of the primary advances that the "Information Age" has brought has been an increase in the number of options that people have for communicating with one another. Examples of these new avenues for communication include email, streaming audio and video, and instant messaging (IM). These new forms of communication enable people to be more productive, as well as enhance their everyday lives.

One type of electronic communication that has become increasingly popular is IM. IM uses a program called an IM client to send a message to another person. A user of IM may have a list, called a contact list or buddy list, of people with whom the user wishes to communicate. This contact list often contains some indication of whether or not a particular person on the list is currently online, that is, whether a device belonging to the person on the list is currently running his/her IM client. When the IM user sends a message to a person, the IM client typically opens a window that allows the user and the contact to view messages that are typed by either party. IM communications are not limited to two people, but rather, a number of people may utilize an IM connection, often called a chat group or chat room, to communicate simultaneously. In addition, IM may be used for sharing links to web pages, images, sounds, and files and for streaming content, such as text, audio and video.

One advantage of an IM communication is that it allows immediate interactive communication between two or more people. That is, the participants in an IM conversation are virtually linked and, as such, are able to send and receive data concurrently over the IM link. This allows for immediate feedback as well as a greater feeling of being connected with the others in the IM conversation.

However, the connectedness that is one of the greatest strengths of IM brings with it some serious shortfalls. First, an IM client will only communicate with another IM client when the first IM client is running. When the IM client is not running, any messages sent to the IM client will simply not be delivered or, in the alternative, an error message will be generated. Furthermore, if the user of an IM client leaves the IM client running while the user is busy or away from his/her terminal, any messages sent to the IM client will remain unanswered. This could be frustrating to senders of the messages, especially if the senders can determine from their IM clients that the IM client of the intended recipient is running. Such users may assume that the intended recipient does not want to talk to them and is ignoring them.

In view of the foregoing there exists a need for a tool that overcomes the above-referenced deficiencies.

SUMMARY OF THE INVENTION

In general, the present invention provides a computer-implemented method, system, tool, and program product for sending a customized reply to an instant message. Specifically, under the present invention, a customized message may be provided for a specific instant messaging contact/availability status combination. Afterward, in the case that the availability status is selected and a message is received from the instant messaging contact, the customized message is automatically sent to the messaging contact. The invention may also be integrated into a calendaring application to determine, for example, whether the message recipient is in a meeting and, if so, to automatically send a reply that gives an estimated ending time for the meeting.

A first aspect of the present invention provides a computer-implemented method for replying to an instant message, comprising: providing an instant messaging contact; providing an availability status of an instant message receiver; providing a customized message corresponding to the instant messaging contact and the availability status; receiving a selection of the availability status; and automatically sending the customized message to the instant messaging contact in response to the instant message having been received from the instant messaging contact.

A second aspect of the present invention provides a computer-implemented system for replying to an instant message, comprising: an initialization system, having: means for providing an instant messaging contact; means for providing an availability status of an instant message receiver; and means for providing a customized message corresponding to the instant messaging contact and the availability status; an availability status selection system for receiving a selection of the availability status; and an instant message response system for automatically sending the customized message to the instant messaging contact in response to the instant message having been received from the instant messaging contact.

A third aspect of the present invention provides a program product stored on a computer readable medium for replying to an instant message, the computer readable medium comprising program code for causing a computer system to perform the following steps: providing an instant messaging contact; providing an availability status of an instant message receiver; providing a customized message corresponding to the instant messaging contact and the availability status; receiving a selection of the availability status; and automatically sending the customized message to the instant messaging contact in response to the instant message having been received from the instant messaging contact.

A fourth aspect of the present invention provides a method for deploying an application for replying to an instant message, comprising: providing a computer infrastructure being operable to: provide an instant messaging contact; provide an availability status of an instant message receiver; provide a customized message corresponding to the instant messaging contact and the availability status; receive a selection of the availability status; and automatically send the customized message to the instant messaging contact in response to the instant message having been received from the instant messaging contact.

A fifth aspect of the present invention provides computer software embodied in a propagated signal for replying to an instant message, the computer software comprising instructions for causing a computer system to perform the following steps: providing an instant messaging contact; providing an availability status of an instant message receiver; providing a customized message corresponding to the instant messaging contact and the availability status; receiving a selection of the availability status; and automatically sending the customized message to the instant messaging contact in response to the instant message having been received from the instant messaging contact.

Therefore, the present invention provides a computer-implemented method, tool, and program product for replying to an instant message.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

BEST MODE FOR CARRYING OUT THE INVENTION

As indicated above, the present invention provides a computer-implemented method, system, tool, and program product for sending a customized reply to an instant message. Specifically, under the present invention, a customized message may be provided for a specific instant messaging contact/availability status combination. Afterward, in the case that the availability status is selected and a message is received from the instant messaging contact, the customized message is automatically sent to the messaging contact. The invention may also be integrated into a calendaring application to determine, for example, whether the message recipient is in a meeting and, if so, to automatically send a reply that gives an estimated ending time for the meeting.

Figure 1:
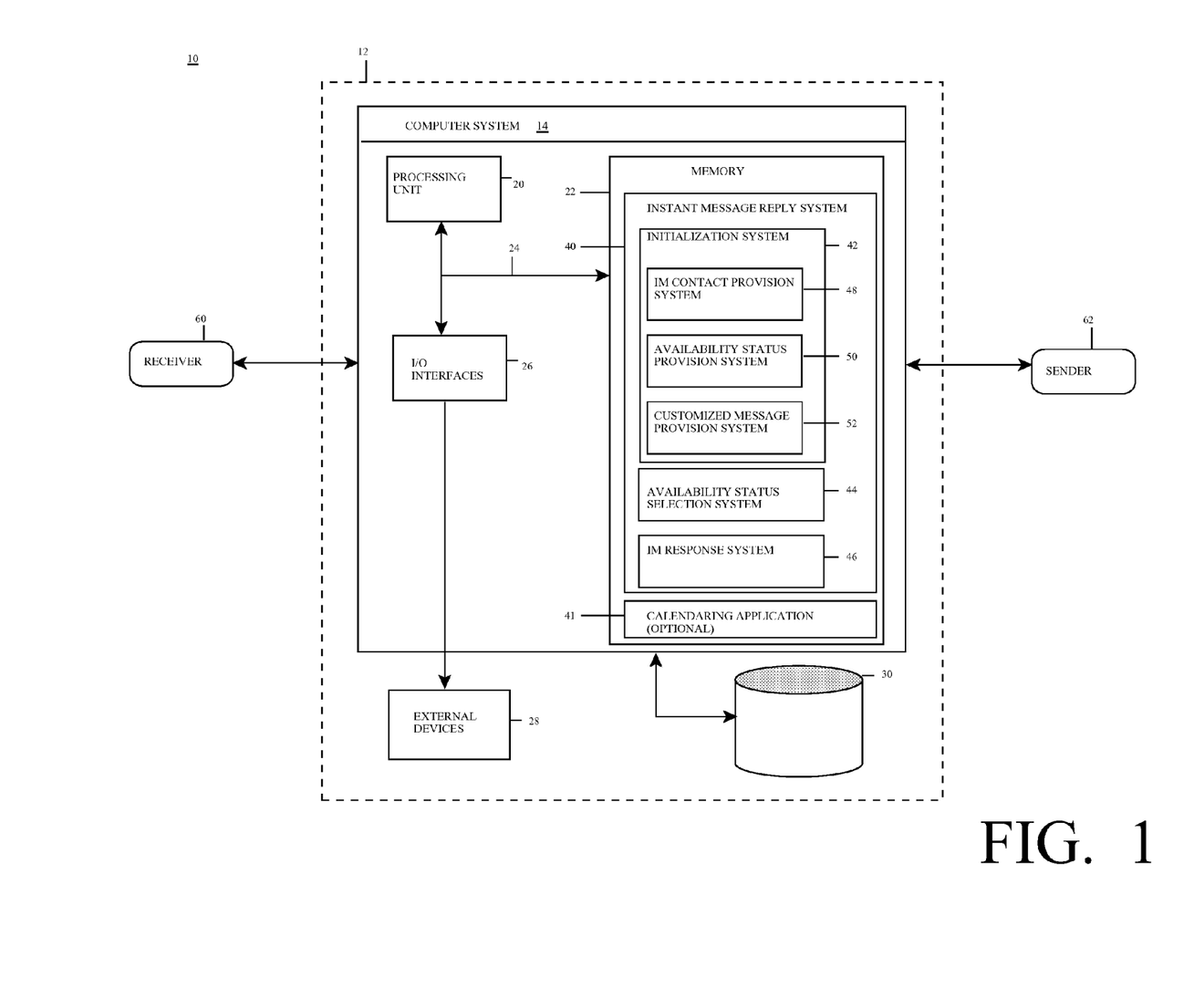
FIG. 1 shows an illustrative system for replying to an instant message according to the present invention.

Referring now to FIG. 1, a system 10 for replying to an instant message according to the present invention is shown. Specifically, FIG. 1 depicts a system 10 in which a customized reply to an instant message may be provided based on an IM contact and availability status. In addition, system 10 automatically sends the customized message in response to an initial message from the IM contact when the availability status has been specified. As depicted, system 10 includes a computer system 14 deployed within a computer infrastructure 12. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 12 is intended to demonstrate that some or all of the components of system 10 could be deployed, managed, serviced, etc. by a service provider who offers to provide automatic replies to instant messages.

As shown, computer system 14 includes a processing unit 20, a memory 22, a bus 24, and input/output (I/O) interfaces 26. Further, computer system 14 is shown in communication with external I/O devices/resources 28 and storage system 30. In general, processing unit 20 executes computer program code, such as an instant message reply system 40 and/or a calendaring application 41, which may be stored in memory 22 and/or storage system 30. While executing computer program code, processing unit 20 can read and/or write data to/from memory 22, storage system 30, and/or I/O interfaces 26. Bus 24 provides a communication link between each of the components in computer system 14. External devices 28 can comprise any devices (e.g., keyboard, pointing device, display, etc.) that enable a user to interact with computer system 14 and/or any devices (e.g., network card, modem, etc.) that enable computer system 14 to communicate with one or more other computing devices.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the various process steps of the invention. Moreover, computer system 14 is only representative of various possible computer systems that can include numerous combinations of hardware. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 20 may comprise a single processing unit, or be distributed across one or more processing units in one or more locations, e.g., on a client and server. Similarly, memory 22 and/or storage system 30 can comprise any combination of various types of data storage and/or transmission media that reside at one or more physical locations. Further, I/O interfaces 26 can comprise any system for exchanging information with one or more external devices 28. Still further, it is understood that one or more additional components (e.g., system software, math co-processing unit, etc.) not shown in FIG. 1 can be included in computer system 14. However, if computer system 14 comprises a handheld device or the like, it is understood that one or more external devices 28 (e.g., a display) and/or storage system(s) 30 could be contained within computer system 14, not externally as shown.

Storage system 30 can be any type of system (e.g., a database) capable of providing storage for information under the present invention, such as contact lists, customized messages, availability status, etc. To this extent, storage system 30 could include one or more storage devices, such as a magnetic disk drive or an optical disk drive. In another embodiment, storage system 30 includes data distributed across, for example, a local area network (LAN), wide area network (WAN) or a storage area network (SAN) (not shown). Although not shown, additional components, such as cache memory, communication systems, system software, etc., may be incorporated into computer system 14.

Shown in memory 22 of computer system 14 is instant message reply system 40, which is a software program that will provide the functions of the present invention, and which includes initialization system 42, availability status selection system 44, and IM response system 46. Initialization system 42, in turn, may include IM contact provision system 48, availability status provision system 50 and customized message provision system 52. Also shown in memory is optional calendaring application 41, which may be linked with instant message reply system 40 as, described in more detail below.

Figure 2:
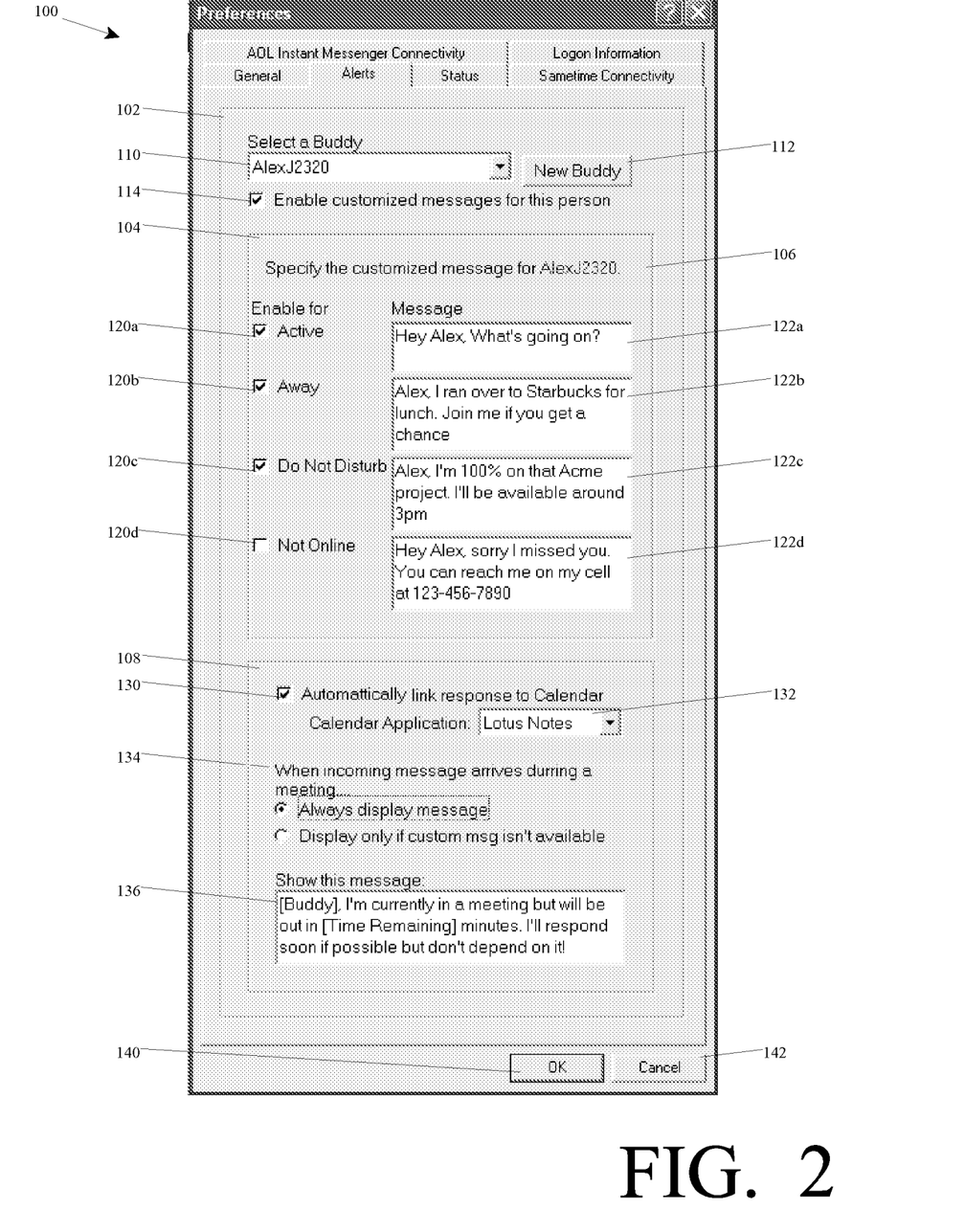
FIG. 2 shows an illustrative electronic view of a form for providing initialization information according to the present invention.

Referring now to FIGS. 1 and 2, collectively, initialization system 42 of instant message reply system 40 will be described in more detail. In summary, initialization system 42 collects and stores all information necessary for automatically sending a customized reply to an instant message. Initialization system 42 may collect the information from user input into a preferences window 100 such as illustrated in FIG. 2 or, in the alternative may retrieve the necessary information from storage (e.g., default preferences). Furthermore, in the case that a user inputs the information, preferences window 100 may encompass a single window into which a user may input all or a majority of the necessary information simultaneously or, in the alternative, may comprise a number of windows for entry of discrete portions of the necessary information. Preferences window 100 may allow for changing of saved preferences, such by use of OK control button 140. In the alternative, preferences window 100 may be closed without saving through use of cancel control button 142.

In any event, IM contact provision system 48 of initialization system 42 allows for provision of an IM contact for sending an automatic reply. IM contact may be a single person, a selection of more than one specific people, and/or one or more group names that are each associated with a group of people. IM contact provision system 48 may include contact provision area 102 of preferences form 100 (FIG. 2). As illustrated, contact provision area 102 may include a buddy selection list 110 for selecting a previously stored buddy. Contact provision area 102 may also allow for input of a new buddy, such as through the use of a new buddy control button 112. In addition, contact provision area 102 may include a contact enablement toggle 114, which allows for selection of which IM contacts to which customized messages may be sent.

Availability status provision system 50 of initialization system 42 allows for providing an availability status of an instant message receiver. An availability status indicates a possible state of availability of a receiver 60 (FIG. 1) of an instant message. For example, an availability status of "not online" may be used for instances in which receiver 60 is not currently online. In contrast, an availability status of "away" may be used for instances in which receiver 60 is online but is away from his/her instant messaging device. Furthermore, an availability status of "do not disturb" may be used for instances in which receiver 60 is online and not away from his/her instant messaging device but does not desire to be disturbed. Other examples of availability statuses may include "active" and "meeting," among others. Regardless, availability status provision system 50 allows for providing an availability status for sending an automatic reply.

Preferences form 100 (FIG. 2) illustrates two different ways of providing an availability status. Availability status provision area 104 includes a number of availability status toggle boxes 120a-d, which may be toggled on and off. Each availability status toggle box 120a-d indicates that a customized message should be sent in the event that an instant message is received while availability status of receiver 60 is one of the toggled availability statuses. In addition, calendar linking area 108 allows for linking of availability status of receiver 60 to a calendaring program. This function will be described in more detail below, but generally allows the system to determine the availability status of receiver 60 based on events and times indicated in the calendaring program.

Customized message provision system 52 of initialization system 42 allows for providing a customized message corresponding to the instant messaging contact and the availability status. To this extent, for a particular IM contact, such as AlexJ2320 (FIG. 2), one customized message may be provided for a status of active while another customized message may be provided for a status of away. Furthermore, for a different IM contact, different messages may be provided from those provided for AlexJ2320. This allows receiver 60 a great amount of flexibility in customizing automatic replies to received messages. One way of providing the customized message is illustrated in customized message provision area 106 of FIG. 2. Customized message provision area 106 includes a number of customized message text boxes 122a-d wherein each text box corresponds to a particular availability status toggle 120a-d and IM contact 110. In contrast, calendar linking area 108 may also include a calendar linking customized message text box 136 for providing a customized message that is linked to the calendaring program. A customized message provided using customized message provision system 52 (FIG. 1) may include text such as illustrated in customized message text boxes 122a-d, may include identifiers for variables such as illustrated in calendar linking customized message text box 136, or may include any other data that may be used for communication, included, but not limited to graphics, audio, and video.

Referring again to FIG. 1, once necessary information has been provided to initialization system 42, instant message reply system 40 is ready to send a customized automatic reply in response to a message from a sender 62. Specifically, availability status selection system 44 receives a selection of the availability status. In one embodiment, the selection of the availability status may be received by receiver 60 directly or by another person that has access to receiver's 60 instant messaging client. For example, in the case that receiver 60 is working on a project and does not wish to be disturbed, receiver 60 may open a window that allows receiver 60 to choose the "do not disturb" selection from a list. Then, when receiver 60 has completed the project, receiver 60 may open the same window and choose the "active" selection from the list.

In an alternative embodiment, in which instant message reply system 40 is linked to a calendaring application, availability status selection system 44 may receive the availability status selection from calendaring application 41. For example, if an entry in calendaring application 41 indicates that a meeting is to begin at 10:00 a.m. and will last one hour, availability status selection system 44 may use the entry to automatically set the availability status to "meeting" at 10:00 a.m. and back to "active" at 11:00 a.m. Furthermore, if receiver's 60 typical workday begins at 8:00 a.m. and ends at 6:00 p.m. availability status selection system 44 may automatically set availability status to "active" at 8:00 a.m. and/or to "away" at 6:00 p.m.

Instant message reply system 40 also includes IM response system 46, for automatically sending the customized message to the instant messaging contact (e.g., sender 62) in response to the initial instant message having been received from the instant messaging contact. That is, in the case that receiver 60 receives an instant message from sender 62, IM response system 46 attempts to match sender 62 to an IM contact provided to IM contact provision system 48. IM response system 46 also determines the availability status selected using availability status selection system 44. IM response system 46 then determines whether a customized message has been provided to customized message provision system 52 that corresponds to the IM contact and availability status. If a customized message is found, IM response system 46 sends the customized message to sender 62. Otherwise, a customized message is not available and appropriate action is taken (e.g., ignoring the message, sending a default message, and/or sending an error message).

Referring now to FIGS. 2-5, an embodiment of the invention is illustrated in which the instant message reply system 40 is linked with a calendaring system. The linking of instant message reply system 40 may be designated, such as by the use of calendar linking toggle 130 of calendar linking area 108 of preferences form 100. The appropriate calendaring application or applications to which instant message reply system 40 is to be linked may be selected, such as by use of calendaring application selection box 132. In addition, one or more calendar linking option controls 134 may be used to set options for the linking of instant message reply system 40 with calendaring application 41. In this example, calendar linking option control 134 specifies that when a message arrives during a meeting, the message provided in calendar linking customized message text box 136 is always displayed. Linking may be specified for a single availability status, such as "in a meeting" for multiple availability statuses, or for all availability statuses.

The following example illustrates one possible set of events in an embodiment in which instant message reply system 40 is linked with calendaring application 41 with regard to the "meeting" availability status. As shown in FIG. 2 in conjunction with FIG. 1, an IM contact of AlexJ2320 has been provided to IM contact provision system 48 using contact provision area 102 in buddy selection list 110 of preferences form 100. An availability status has also been provided to availability status provision system 50 by toggling calendar linking toggle 130 of calendar linking area 108 of preferences form 100 to the "on" position. Furthermore, a customized message has been provided to customized message provision system 52 in calendar linking customized message text box 136 in calendar linking area 108.

Figure 3:
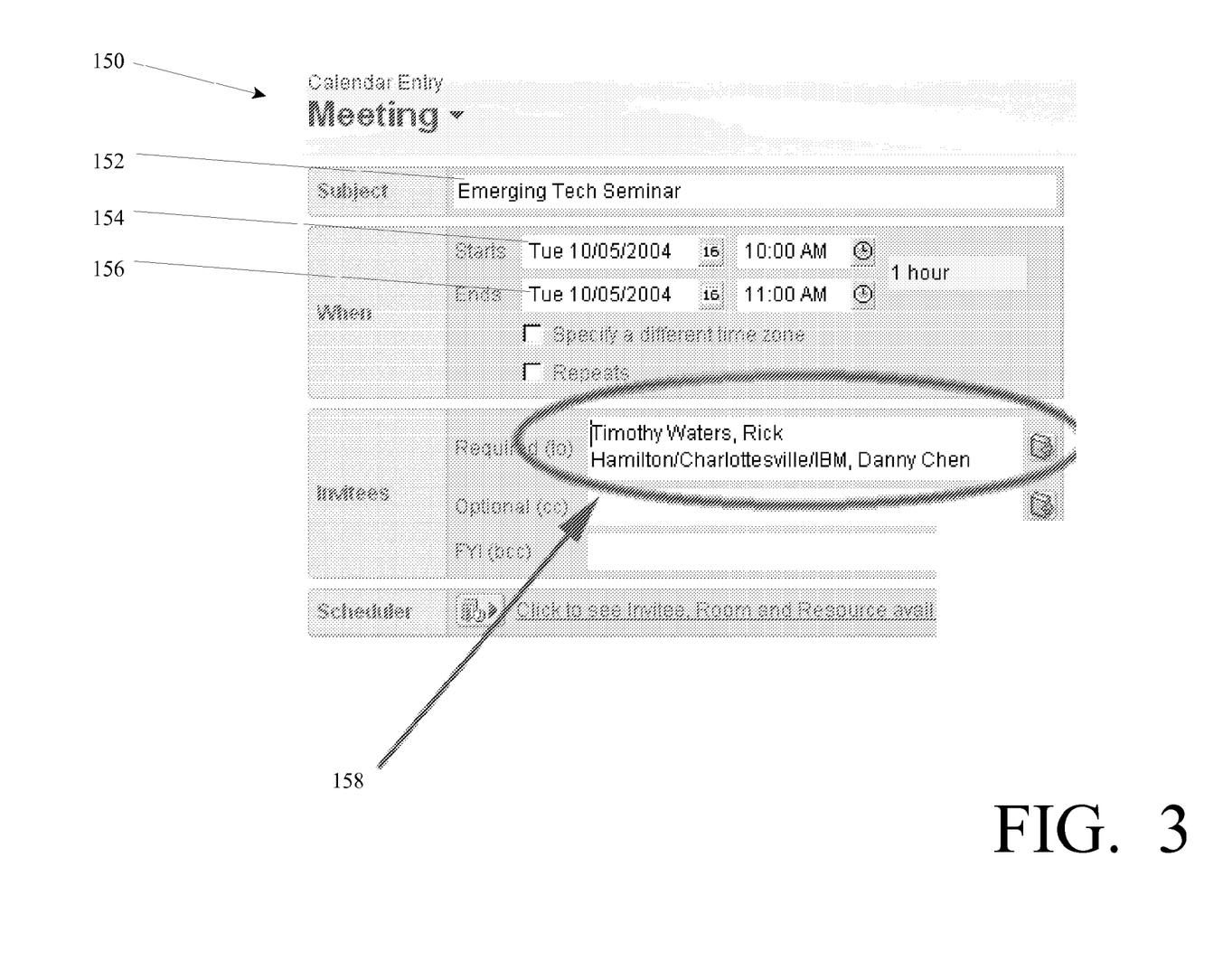
FIG. 3 shows another illustrative electronic view according to the present invention.

FIG. 3 shows an illustrative electronic example of a meeting calendaring entry 150 in calendaring application 41. Meeting calendaring entry 150 has a meeting subject 152 of Emerging Tech Seminar, a meeting start time 154 of Tue Oct. 05, 2004 at 10:00 a.m., a meeting end time 156 of Tue Oct. 05, 2004 at 11:00 a.m., and a meeting invitee list 158 having at least one meeting invitee. Please note that IM contact AlexJ2320 is not among the meeting invitees in meeting invitee list 158. At 10:00 a.m. on Tue Oct. 05, 2004 calendaring application 41 will know that the meeting specified by meeting calendaring entry 150 has started. Because instant message reply system 40 is linked to the calendaring system, availability status selection system 44 of instant message reply system 40 will receive a selection of "meeting" based on the input from the calendaring system.

Figure 4:
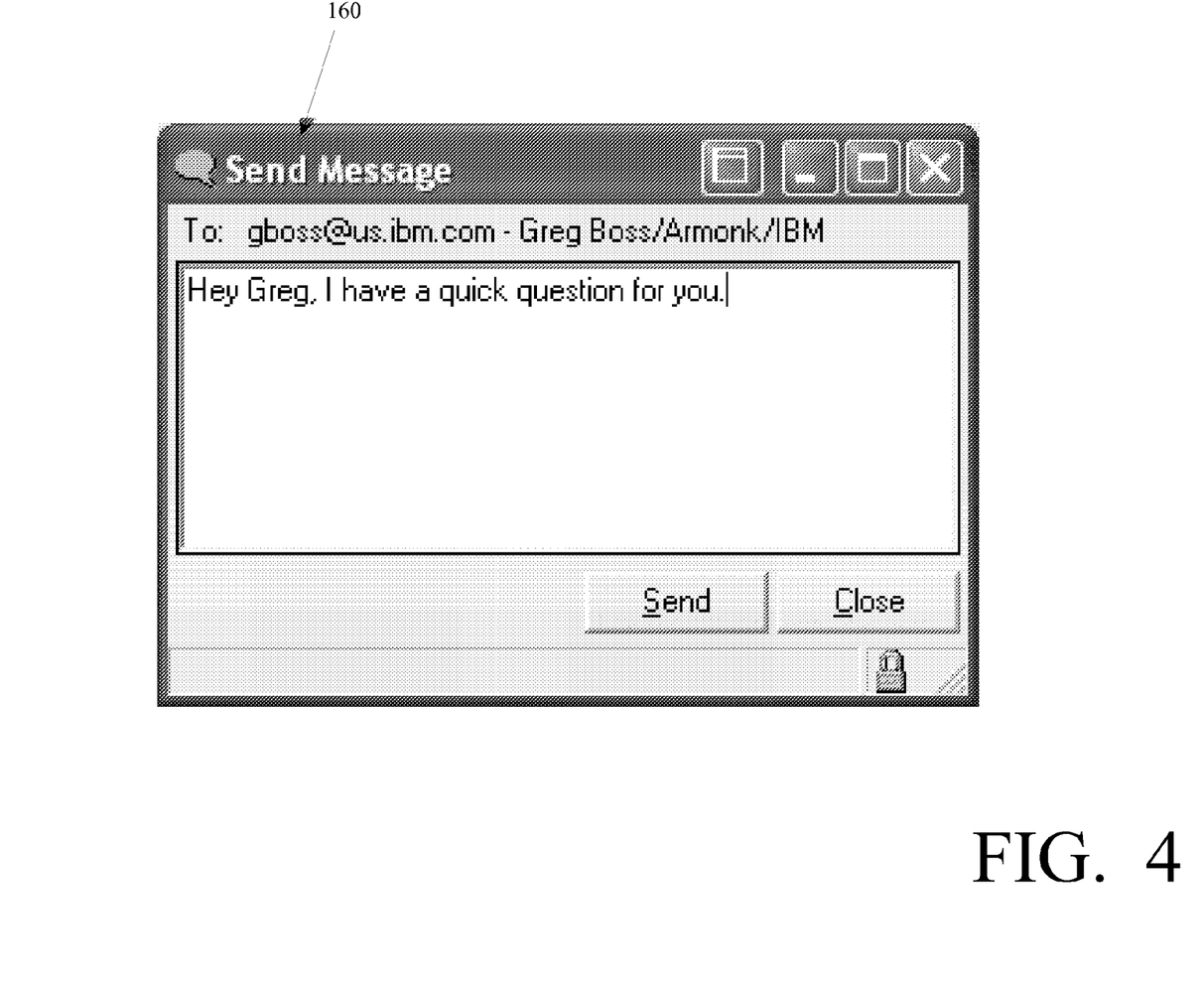
FIG. 4 shows another illustrative electronic view according to the present invention.

FIG. 4 shows a message 160 sent from sender 62 to receiver 60 (FIG. 1) while the meeting is in progress. In one embodiment, IM response system 46 compares the IM contact of sender 62 to those in meeting invitee list 158 and allows message 160 to be delivered to receiver 60 if the name is present. In any case, assume the message is from the IM contact specified in IM contact provision system 48 (i.e., AlexJ2320). Also assume that message 160 is received between meeting start time 154 of 10:00 a.m. and meeting end time 156 of 11:00 a.m. on Tue Oct. 05, 2004 (e.g., 10:38 a.m.).

Figure 5:
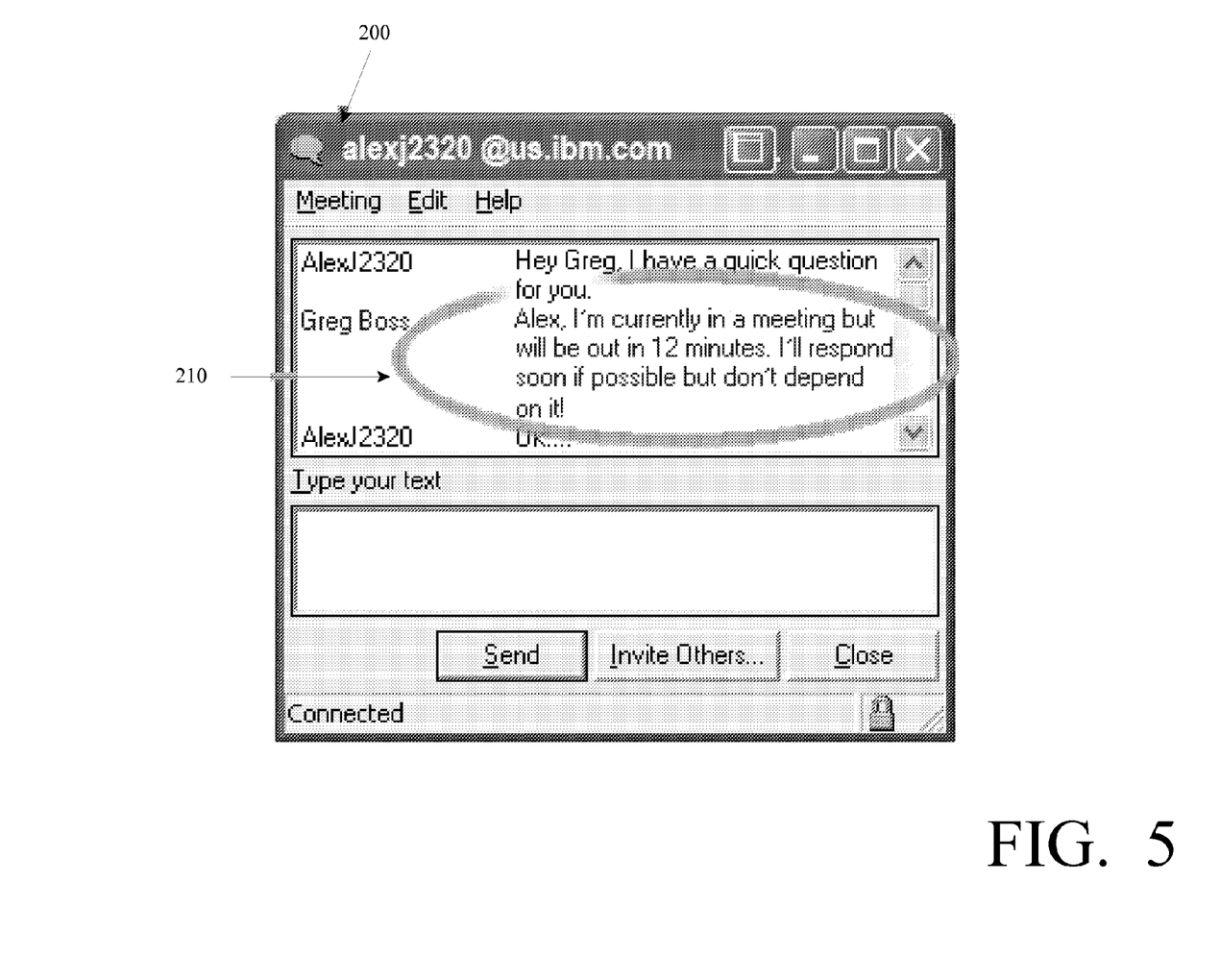
FIG. 5 shows another illustrative electronic view according to the present invention.

FIG. 5 shows an example of an instant messaging client 200 having a customized reply 210 sent by IM response system 46 of instant message reply system 40 in response to message 160 of the above example. Notice that the variable [Buddy] in the message provided to custom message provision system 52 via calendar linking customized message text box 136 (FIG. 2) has been replaced with the text Alex. Furthermore, the variable [Time Remaining] in calendar linking customized message text box 136 of FIG. 2 has been replaced with the text 12 minutes (i.e., a calculation of the time remaining in the meeting based on the difference between meeting end time 156 of 11:00 a.m. (FIG. 2) and the time that the message was received at 10:38 a.m.). Subsequently, when the meeting end time 156 of 11:00 a.m. (FIG. 2) is reached, availability status selection system 44 (FIG. 1) may also automatically change the availability status from "meeting" based on input from calendaring system.

Figure 6:
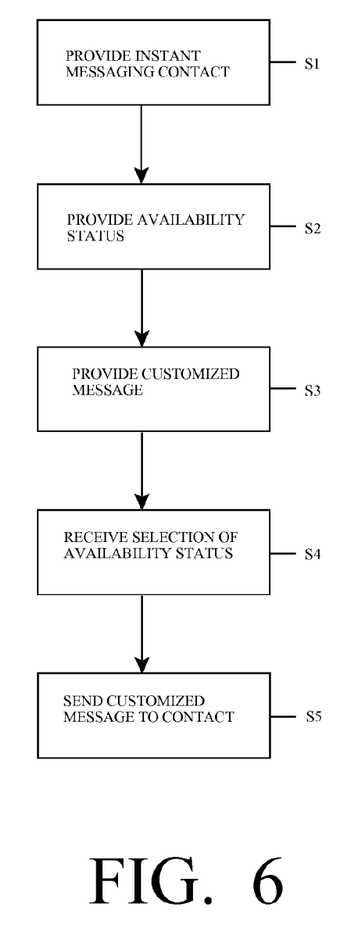
FIG. 6 shows an illustrative method flow diagram according to the present invention.

Turning now to FIG. 6, a flow chart of a method according to one embodiment of the present invention is depicted. FIG. 6 will be described with reference to FIGS. 1 and 2. In first step S1, IM contact provision system 48 is provided an instant messaging contact. The instant messaging contact may be provided via user input, such as by using contact provision area 102 of preferences form 100, or in an alternate way, such as by retrieving the instant messaging contact from storage system 30. As stated above, the instant messaging contact may comprise one or more names that each designates a single person or group of persons. In step S2, availability status provision system 50 is provided an availability status of an instant message receiver. Availability status may be provided via user input, such as by using availability status provision area 104 or calendar linking area 108 or by any other method, for example, retrieval from storage system 30. In step S3, customized message provision system 52 is provided a customized message corresponding to the instant messaging contact and the availability status. The customized message may be provided via user input, such as through customized message text boxes 122*a-d* of customized message provision area 106 and/or calendar linking customized message text box 136 of calendar linking area 108. In addition, the customized message may be provided by other means, such as the retrieval of a default message from storage system 30.

In step S4, availability status selection system 44 receives a selection of the availability status. As stated previously, the selection may be received via user input, such as by selecting from a list of availability statuses in a pop-up window. Alternatively, the selection may be arrived at using input from calendaring application 41 that is linked with instant message reply system 40. Finally, in step S5, the customized message is automatically sent to the instant messaging contact in response to the instant message having been received from the instant messaging contact.

Figure 7:
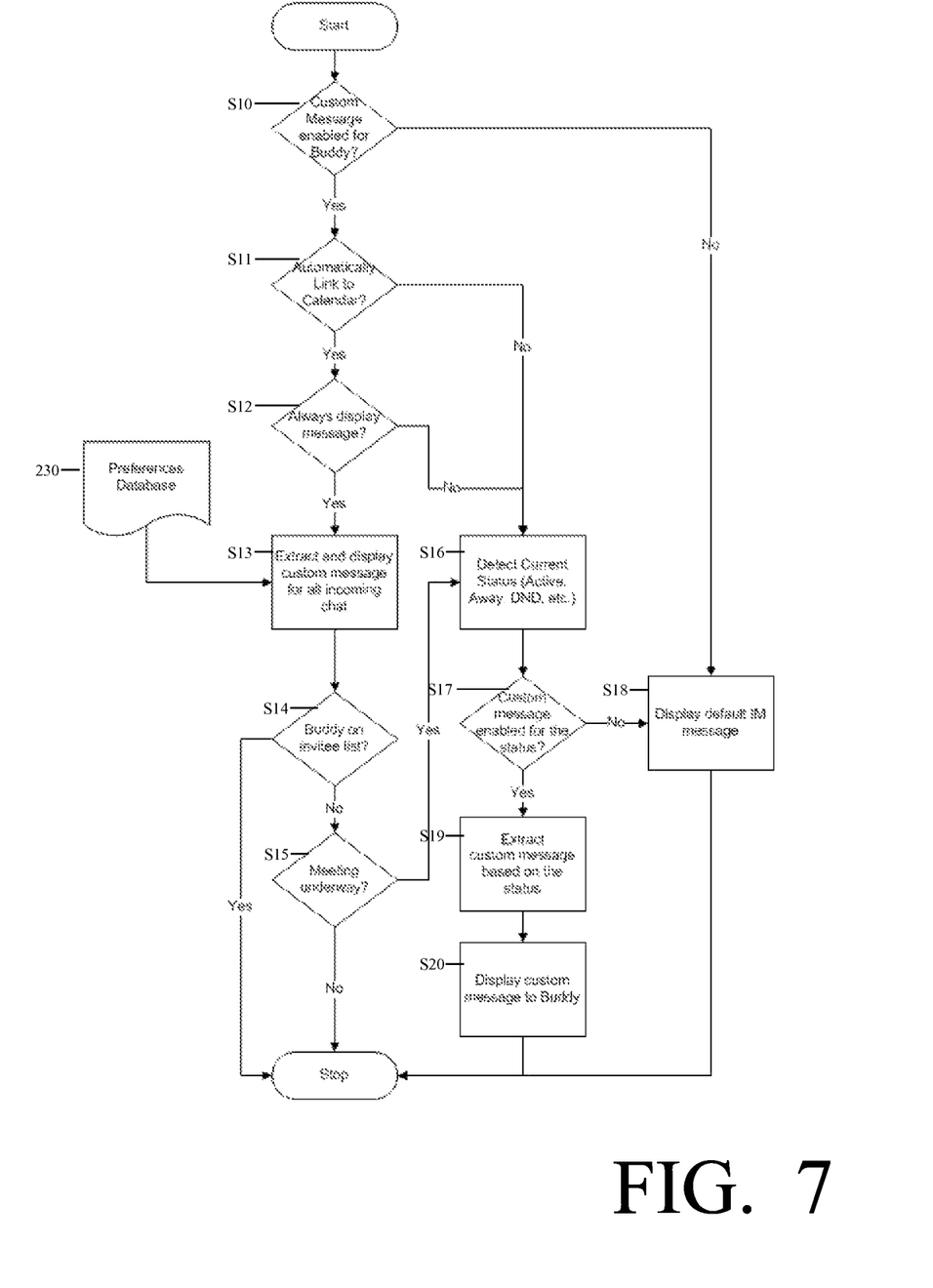
FIG. 7 shows an alternate illustrative method flow diagram according to the present invention.

Turning now to FIG. 7, a flow chart showing one embodiment of the workings in step S5 (FIG. 6) of IM response system 46 (FIG. 1) in evaluating the actions to be taken with regard to a message from sender 62 is illustrated. In step S10 a determination is made as to whether a custom message has been enabled for the particular sender 62. If a custom message has not been enabled, a default message is returned to sender 62 in step S18 and execution is halted. Otherwise a determination is made in step S11 as to whether instant message reply system 42 is linked to calendaring application 41.

If an affirmative determination is made in step S11, execution proceeds to step S12, in which it is determined whether a message pertaining to calendaring application 41 is always to be displayed or, in the alternative, to be displayed only if a customized message does not exist. Otherwise, the process flows to step S16. If it is determined in step S12 that the message pertaining to calendaring application 41 is always to be displayed, the custom message is retrieved from a preferences database 230 and displayed for all incoming chat in step S13. Otherwise, the process flows to step S16. Subsequently, it is determined in step S14 whether sender 62 of the message is on the invitee list for the meeting. If so, execution ends. If not, execution branches to step S15, where a determination is made as to whether a meeting is underway. If not, execution ends. If so, execution branches to step S16.

In step S16, the process detects the availability status that has most recently been selected using availability status selection system 44. In step S17, a determination is made as to whether a custom message is enabled for the current availability status. If a negative determination is made, step S18 displays a default message and execution is halted. Otherwise, step S19 extracts the custom message based on the current availability status, step S20 displays the custom message to sender 62 and execution terminates.

While shown and described herein as a method and system for replying to an instant message, it is understood that the invention further provides various alternative embodiments. For example, in one embodiment, the invention provides a computer-readable/useable medium that includes computer program code to enable a computer infrastructure to reply to an instant message. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 22 (FIG. 1) and/or storage system 30 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer an instant message reply service. In this case, the service provider can create, maintain, support, etc., a computer infrastructure, such as computer infrastructure 12 (FIG. 1) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for replying to an instant message. In this case, a computer infrastructure, such as computer infrastructure 12 (FIG. 1), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. For example, IM contact provision system 48, availability status provision system 50 and customized message provision system 52, shown in FIG. 1 as part of initialization system 42, may instead be separate systems. Such modifications and variations that may be apparent to a person skilled in the art are intended to be included within the scope of the invention as defined by the accompanying claims.

We claim:

1. A computer-implemented method for replying to an instant message from an instant message contact, comprising:

providing a preferences interface for managing messages to an instant message contact, the preferences interface including:

a user selectable designation of one of a set of instant message contacts;

user selectable message response types including at least one of active, away, do not disturb, and not online, for use in responding to the designated one of the instant message contacts; and user fillable response messages corresponding with each of the user selectable message response types for use in responding to the designated one of the instant message contacts;

receiving a calendar availability status of an instant message receiver from a calendaring application;

determining whether previously receiver-defined settings enable display of a message corresponding to the calendaring application;

automatically providing a first one of the user fillable response messages corresponding to the instant messaging contact and the calendar availability status of the receiver in response to the previously receiver-defined settings enabling display of the message corresponding to the calendaring application, wherein the first one of the user fillable response messages is selected based on both an identity of the instant messaging contact and the calendar availability status of the receiver;

determining a current status of the receiver and providing a second one of the user fillable response messages based upon both the identity of the instant messaging contact and the current status of the receiver in response to the previously receiver-defined settings not enabling display of the message corresponding to the calendaring application; and automatically sending one of the first one of the user fillable response messages or the second one of the user fillable response messages to the instant messaging contact in response to the instant message having been received from the instant messaging contact.

2. The method of claim 1, wherein the instant messaging contact is an individual.

3. The method of claim 1, wherein the instant messaging contact is a group.

4. The method of claim 1, wherein the set of instant message contacts are distinct buddies on a buddy list of the instant message receiver.

5. The method of claim 1, wherein the calendar availability status of the instant message receiver indicates a meeting status, the method further comprising:
    determining whether the instant messaging contact is a required participant in a meeting; and
    allowing the first user fillable message to be delivered if the determination is not positive.

6. The method of claim 5, further comprising:
    calculating a remaining time in the meeting; and
    displaying an indicator of the remaining time in the meeting in the first one of the user fillable response messages.

7. A computer-implemented system including at least one computing device for replying to an instant message from an instant message contact, comprising:
    an initialization system comprising:
        a component for providing a preferences interface for managing messages to an instant message contact, the preferences interface including:
            a user selectable designation of one of a set of instant message contacts;
            user selectable message response types including at least one of active, away, do not disturb, and not online, for use in responding to the designated one of the instant message contacts; and
            user fillable response messages corresponding with each of the user selectable message response types for use in responding to the designated one of the instant message contacts;
        a component for receiving a calendar availability status of an instant message receiver from a calendaring application;
        a component for determining whether previously receiver-defined settings enable display of a message corresponding to the calendaring application;
        a component for automatically providing a first one of the user fillable response messages corresponding to the instant messaging contact and the calendar availability status of the receiver in response to the previously receiver-defined settings enabling display of the message corresponding to the calendaring application,
            wherein the first one of the user fillable response messages is selected based on both an identity of the instant messaging contact and the calendar availability status of the receiver; and
        a component for determining a current status of the receiver and providing a second one of the user fillable response messages based upon both the identity of the instant messaging contact and the current status of the receiver, in response to the previously receiver-defined settings not enabling display of the message corresponding to the calendaring application; and
    an instant message response system for automatically sending one of the first one of the user fillable response messages or the second one of the user fillable response messages to the instant messaging contact in response to the instant message having been received from the instant messaging contact.

8. The system of claim 7, wherein the instant messaging contact is an individual.

9. The system of claim 7, wherein the instant messaging contact is a group.

10. The system of claim 7, wherein the set of message contacts are distinct buddies on a buddy list of the instant message receiver.

11. The system of claim 7, wherein the calendar availability status of the instant message receiver indicates a meeting status, the system further comprising:
    a component for determining whether the instant messaging contact is a required participant in a meeting; and
    a component for allowing the first user fillable message to be delivered if the determination is not positive.

12. The system of claim 11, further comprising:
    a component for calculating a remaining time in the meeting; and
    a component for displaying an indicator of the remaining time in the meeting in the first one of the user fillable response messages.

13. A program product stored on a non-transient computer readable storage medium for replying to an instant message from an instant message contact, the computer readable medium comprising a storage medium including program code for causing a computer system to perform the following:
    providing a preferences interface for managing messages to an instant message contact, the preferences interface including:
        a user selectable designation of one of a set of instant message contacts;
        user selectable message response types including at least one of active, away, do not disturb, and not online, for use in responding to the designated one of the instant message contacts; and
        user fillable response messages corresponding with each of the user selectable message response types for use in responding to the designated one of the instant message contacts;
    receiving a calendar availability status of an instant message receiver from a calendaring application;
    determining whether previously receiver-defined settings enable display of a message corresponding to the calendaring application;
    automatically providing a first one of the user fillable response messages corresponding to the instant messaging contact and the calendar availability status of the receiver in response to the previously receiver-defined settings enabling display of the message corresponding to the calendaring application,
        wherein the first one of the user fillable response messages is selected based on both an identity of the instant messaging contact and the calendar availability status of the receiver;
    determining a current status of the receiver and providing a second one of the user fillable response messages based upon both the identity of the instant messaging contact and the current status of the receiver in response to the previously receiver-defined settings not enabling display of the message corresponding to the calendaring application; and automatically sending one of the first one of the user fillable response messages or the second one of the user fillable response messages to the instant messaging contact in response to the instant message having been received from the instant messaging contact.

14. The program product of claim 13, wherein the instant messaging contact is an individual.

15. The program product of claim 13, wherein the instant messaging contact is a group.

16. The program product method of claim 13, wherein the set of instant message contacts are distinct buddies on a buddy list of the instant message receiver.

17. The program product of claim 13, wherein the calendar availability status of the instant message receiver indicates a meeting status, the program code further causing the computer system to perform the following:
  determining whether the instant messaging contact is a required participant in a meeting; and
  allowing the first user fillable message to be delivered if the determination is not positive.

18. The program product of claim 17, further comprising:
  calculating a remaining time in the meeting; and
  displaying an indicator of the remaining time in the meeting in the first one of the user fillable response messages.

19. A method for deploying an application for replying to an instant message from an instant message contact, comprising:
  providing a computer system configured to:
    provide a preferences interface for managing messages to an instant message contact, the preferences interface including:
      a user selectable designation of one of a set of instant message contacts;
      user selectable message response types including at least one of active, away, do not disturb, and not online, for use in responding to the designated one of the instant message contacts; and
      user fillable response messages corresponding with each of the user selectable message response types for use in responding to the designated one of the instant message contacts;
    receive a calendar availability status of an instant message receiver from a calendaring application;
    determine whether previously receiver-defined settings enable display of a message corresponding to the calendaring application;
    automatically provide a first one of the user fillable response messages corresponding to both an identity of the instant messaging contact and the calendar availability status of the receiver in response to the previously receiver-defined settings enabling display of the message corresponding to the calendaring application,
    wherein the first one of the user fillable response messages is selected based on both an identity of the instant messaging contact and the calendar availability status of the receiver;
    determining a current status of the receiver and providing a second one of the user fillable response messages based upon both the identity of the instant messaging contact and the current status of the receiver in response to the previously receiver-defined settings not enabling display of the message corresponding to the calendaring application; and
    automatically send one of the first one of the user fillable response messages or the second one of the user fillable response messages to the instant messaging contact in response to the instant message having been received from the instant messaging contact.

* * * * *